United States Patent [19]

Marwitz et al.

[11] 4,433,007

[45] Feb. 21, 1984

[54] PROCESS FOR COATING SUBSTRATES WITH AQUEOUS EMULSIONS CONTAINING ORGANOPOLYSILOXANES

[75] Inventors: Heinrich Marwitz; Kurt Ullrich; Karl Huhn, all of Burghausen, Fed. Rep. of Germany

[73] Assignee: Wacker Chemie GmbH, Munich, Fed. Rep. of Germany

[21] Appl. No.: 345,880

[22] Filed: Feb. 4, 1982

[30] Foreign Application Priority Data

Feb. 12, 1981 [DE] Fed. Rep. of Germany ....... 3105148

[51] Int. Cl.$^3$ .......................... B05D 3/14; B05D 3/02
[52] U.S. Cl. ................................... 427/54.1; 427/379; 427/387; 427/407.1; 427/408; 427/411; 427/412; 428/447; 524/506; 524/539; 524/588; 524/837; 524/861; 524/862
[58] Field of Search .................... 427/387, 407.1, 54.1, 427/379, 381, 44, 408, 411, 412; 428/447, 452; 524/506, 539, 588, 837, 861, 862; 528/15, 31, 32

[56] References Cited

U.S. PATENT DOCUMENTS

| | | | |
|---|---|---|---|
| 3,445,420 | 5/1969 | Kookootsedes et al. | 524/862 |
| 4,130,707 | 12/1978 | Leister et al. | 427/387 |
| 4,184,006 | 1/1980 | Hockemeyer et al. | 427/387 |
| 4,232,088 | 11/1980 | Humphrey | 427/54.1 |
| 4,304,820 | 12/1981 | Deubzer et al. | 427/387 |
| 4,340,090 | 7/1982 | Matsushita et al. | 427/387 |
| 4,340,647 | 7/1982 | Eckberg | 524/588 |

*Primary Examiner*—Sadie L. Childs

[57] ABSTRACT

A process for coating a substrate which comprises applying to the substrate an aqueous emulsion containing:
(1) A diorganopolysiloxane having terminal SiC-bonded vinyl groups;
(2) An organopolysiloxane containing at least three Si-bonded hydrogen atoms per molecule;
(3) A catalyst which promotes the addition of Si-bonded hydrogen to an aliphatic multiple bond; and if desired,
(4) An agent which delays or retards the addition at room temperature; and
(5) A thickening agent, which may be mixed with or added separately to the emulsion, and prior to cross-linking the organopolysiloxane, applying separately or together with one or more of the constituents (1) through (5);
(6) A vinyl-containing trimethylsiloxy end-blocked diorganopolysiloxane in which the vinyl group is bonded to from 10 to 50 percent of the number of the silicon atoms of the diorganopolysiloxane units, and the other organic radicals are free of aliphatic multiple bonds;
(7) An organosilicon adhesive compound; and
(8) At least one aqueous dispersion of a polymer selected from the group consisting of ethylene, vinyl acetate, acrylic acid esters, and copolymers containing at least two of these monomers and thereafter crosslinking the coating.

15 Claims, No Drawings

PROCESS FOR COATING SUBSTRATES WITH AQUEOUS EMULSIONS CONTAINING ORGANOPOLYSILOXANES

The present invention relates to a process for coating substrates and more particularly to a process for coating substrates with aqueous organopolysiloxane emulsions to impart water-proofed properties, hydrophobic and abrasion resistance to the coated substrates.

BACKGROUND OF THE INVENTION

It is known that substrates, including fabrics made of natural or synthetic fibers, may be coated with aqueous emulsions containing a diorganopolysiloxane having terminal SiC-bonded vinyl groups, an organopolysiloxane having at least 3 Si-bonded hydrogen atoms per molecule and a catalyst which promotes the addition of Si-bonded hydrogen to vinyl groups. These aqueous emulsions may also contain thickeners and agents which delay or retard the addition of Si-bonded hydrogen to vinyl groups at room temperature. (See British Pat. No. 1,541,801 to Wacker-Chemie GmbH.) In contrast to the coatings known heretofore, the coatings of this invention exhibit better water-proofed properties, are more hydrophobic, are more resistant to abrasion, and are more resistant to washing and cleaning.

Therefore, it is an object of this invention to provide a process for coating substrates. Another object of this invention is to provide a process for coating substrates to impart water-proofed properties thereto. Still another object of this invention is to provide a process for coating substrates to enhance their resistance to abrasion. A further object of this invention is to treat a substrate with an aqueous emulsion to improve the water-proofed properties of the treated substrate. A still further object of this invention is to treat a fabric with an aqueous organopolysiloxane emulsion which is capable of being crosslinked to form a coating thereon.

SUMMARY OF THE INVENTION

The foregoing objects and others which will become apparent from the following description are accomplished in accordance with this invention, generally speaking, by providing a process for coating a substrate which comprises coating the substrate with an aqueous organopolysiloxane emulsion containing:

(1) A diorganopolysiloxane having terminal SiC-bonded vinyl groups;

(2) An organopolysiloxane containing at least three Si-bonded hydrogen atoms per molecule;

(3) A catalyst which promotes the addition of Si-bonded hydrogen to an aliphatic multiple bond; and, if desired (4) An agent which delays or retards the addition at room temperature; and (5) A thickening agent, which may be added separately or combined with the aqueous emulsion, applying to the substrate prior to crosslinking the organopolysiloxane;

(6) A vinyl-containing trimethylsiloxy end-blocked diorganopolysiloxane in which the vinyl group is bonded to from 10 to 50 percent of the number of the silicon atoms of the diorganosiloxane units, and the remaining organic radicals bonded to the silicon atoms are free of aliphatic multiple bonds;

(7) An organosilicon adhesive compound; and (8) At least one aqueous dispersion of a polymer selected from the group consisting of ethylene, vinyl acetate, an acrylic acid ester and copolymers containing at least two of these monomers, in which the constituents (6) through (8) may be applied separately to the substrate or mixed with one or more of the constituents (1) through (5), and thereafter crosslinking the coating on the substrate.

DETAILED DESCRIPTION OF THE INVENTION

Any substrate which has been or could have been coated with a composition containing a diorganopolysiloxane containing SiC-bonded vinyl groups, an organopolysiloxane having Si-bonded hydrogen and a catalyst which promotes the addition of Si-bonded hydrogen to an aliphatic multiple bond may be coated with the process of this invention. Examples of substrates which may be coated with the process of this invention are textiles, paper, cardboard, asbestos board, as well as wood and cork. The paper may consist of low-value types of paper such as absorbent paper or more expensive types of paper, such as wood-free paper. The textiles treated may consist of natural or synthetic fibers. These fibers may be woven or nonwoven, for example, they may be present in the form of fleece. Especially good, water-proof coatings are achieved when the process of this invention is applied to textile substrates which consist at least partially of fine filament yarns, such as polyamide taffeta and polyester fabrics employing filament yarn as the warp yarn and staple fiber as the weft yarn.

Any diorganopolysiloxanes having terminal SiC-bonded vinyl groups, which could heretofore be employed in an aqueous emulsion may be employed as the diorganopolysiloxanes (1) in this invention. Such organopolysiloxanes can be represented by the following general formula

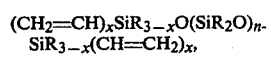

where R represents the same or different hydrocarbon radicals and substituted hydrocarbon radicals substantially free of aliphatic multiple bonds, x is 1, 2 or 3, and more preferably 1, and n represents an integer having a value such that the diorganopolysiloxanes have an average viscosity of from about 1,000 to 100,000 mPa.s at 25° C.

Although this is generally not shown in the above formulas, siloxane units other than the diorganosiloxane units, i.e., units of the formula $SiR_2O$, may be present within or along the organopolysiloxane chain of the above formula. Examples of such other siloxane units which are generally present only as impurities, are especially those of the formula $RSiO_{3/2}$, $R_3SiO_{\frac{1}{2}}$ and $SiO_{4/2}$, where R is the same as above. It is preferred that such other siloxane units not exceed about one mol percent in the molecules of the diorganopolysiloxane (1).

Examples of SiC-bonded organic radicals which are represented by R in the above formula, are alkyl radicals such as the methyl, ethyl, n-propyl and the isopropyl radicals as well as butyl, octyl, tetradecyl and octadecyl radicals; cycloaliphatic hydrocarbon radicals such as the cyclopentyl and the cyclohexyl radicals, as well as the methylcyclohexyl radicals; aryl radicals such as the phenyl radical; alkaryl radicals such as the tolyl radicals; and aralkyl radicals such as the benzyl and the beta-phenylethyl radicals. Examples of substituted hydrocarbon radicals in the diorganopolysiloxanes (1) are for example, halogenated hydrocarbon radicals such as the 3,3,3-trifluoropropyl radical, and the o-, p- and m-chlorophenyl radicals; and cyanoalkyl radicals such as the cyanoethyl radical. It is preferred that at least 90 percent of the number of SiC-bonded organic radicals other than the SiC-bonded vinyl groups in the diorganopolysiloxanes (1), be methyl radicals because of their availability.

The diorganopolysiloxanes (1) may consist of identical copolymers or mixtures of different copolymers having the same degree of polymerization or the diorganopolysiloxanes (1) may consist of mixtures of the same or different copolymers having different degrees of polymerization. When the diorganopolysiloxanes (1) contain different diorganopolysiloxane units, then these different units may be distributed at random or they may be present in the form of block copolymers.

In order to ensure that the diorganopolysiloxanes (1) can be easily emulsified, it is preferred that they have an average viscosity of from 3000 to 20,000 mPa.s at 25° C.

The same organopolysiloxanes having at least 3 Si-bonded hydrogen atoms per molecule which have been or could have been used heretofore in preparing coatings from aqueous emulsions containing organopolysiloxanes having vinyl groups and organopolysiloxanes having at least 3 Si-bonded hydrogen atoms per molecule and a catalyst which promotes the addition of Si-bonded hydrogen to an aliphatic multiple bond, may be used in the process of this invention as the diorganopolysiloxane (2) having at least 3 Si-bonded hydrogen atoms per molecule. In the organopolysiloxanes (2) having at least 3 Si-bonded hydrogen atoms per molecule, the silicon valences which are not saturated by hydrogen and siloxane-oxygen atoms, are preferably saturated with methyl, ethyl, or phenyl radicals, or a mixture of at least two such radicals.

The organopolysiloxanes (2) having at least 3 Si-bonded hydrogen atoms per molecule, may be represented by the following general formula:

where R' represents hydrogen or the same or different radicals, such as the methyl, ethyl or phenyl radicals, and p represents an integer having a value of from about 10 to about 500, with the proviso that only one hydrogen atom may be bonded to a silicon atom and the ratio of $R_2'SiO$ units wherein both R'(s) are hydrocarbon radicals, to the HR'SiO units in which R' is a hydrocarbon radical, must be between 3:1 and 1:3. It is preferred that R' be methyl, when it is not hydrogen.

The same or different molecules of organopolysiloxanes having at least 3 Si-bonded hydrogen atoms per molecule may be used in the process of this invention.

It is preferred that the organopolysiloxane (2) having at least 3 Si-bonded hydrogen atoms per molecule be employed in an amount of from about 5 to 15 parts by weight for each 60 to 90 parts by weight of the diorganopolysiloxane (1).

Any of the catalysts which have been or could have been used heretofore for promoting the addition of Si-bonded hydrogen to an aliphatic multiple bond may be used as catalysts (3) for promoting the addition of Si-bonded hydrogen to an aliphatic multiple bond in the process of this invention.

Examples of such catalysts are metallic and finely dispersed platinum, ruthenium, rhodium, palladium, and iridium, in which these metals may be present on solid carriers, such as silicon dioxide, aluminum oxide, or activated charcoal. Compounds or complexes of these elements, such as $PtCl_4$, $H_2PtCl_6.6H_2O$, $Na_2PtCl_4.4H_2O$, platinum-olefin complexes, platinum-alcohol or platinum-alcoholate complexes, platinum-ether complexes, platinum-aldehyde complexes, platinum-ketone complexes, including the reaction products of $H_2PtCl_6.6H_2O$ and cyclohexanone, platinum-vinylsiloxane complexes, especially platinum-divinyltetramethyldisiloxane complexes, which have or are free of any detectible inorganically bonded halogen, bis-(gamma-picoline)-platinum dichloride, trimethylene pyridine-platinum dichloride, dicyclopentadiene platinum dichloride, and dimethylsulfoxide-ethylene-platinum-(II)-dichloride, as well as a reaction product obtained from platinum tetrachloride dissolved in 1-octene with sec.-butylamine, may be used as catalysts (3) in the process of this invention.

Platinum compounds or platinum complexes are the preferred catalysts (3) which promote the addition of Si-bonded hydrogen to an aliphatic multiple bond.

It is possible to use only one type of catalyst, or it is possible to use a mixture containing at least two such catalysts (3) to promote the addition of Si-bonded hydrogen to an aliphatic multiple bond.

If the catalyst (3) which promotes the addition of Si-bonded hydrogen to an aliphatic multiple bond is a platinum compound or a platinum complex, is preferably diluted with a diluent to a concentration of about 1 percent by weight, calculated as elemental platinum before it is used in the process of this invention. The catalyst is preferably used in an amount of from about 0.2 to 1 part by weight for each 60 to 90 parts by weight of the diorganopolysiloxane (1).

In order to enhance the stability of the compositions containing an organopolysiloxane having SiC-bonded vinyl groups, an organopolysiloxane having Si-bonded hydrogen atoms and a catalyst which promotes the addition of Si-bonded hydrogen to an aliphatic multiple bond, it is preferred that these compositions contain at least one agent (4) which delays or retards the addition of Si-bonded hydrogen to an aliphatic multiple bond. Examples of such agents are acetylenic alcohols, such as ethinylcyclohexanol and 2-methyl-3-butine-2-ol; 1,3-divinyl-1,1,3,3-tetramethyldisiloxane and trichloroethylene.

If an acetylenic alcohol is used as the agent (4) to delay or retard the addition of Si-bonded hydrogen to an aliphatic multiple bond at room temperature, then it is preferably employed in an amount of from 0.05 to 2 parts by weight for each 60 to 90 parts by weight of the diorganopolysiloxane (1).

Any material which is a thickening agent for aqueous systems may be used as the thickening agent (5), in the process of this invention. Preferred examples of suitable thickening agents are salts of polyacrylic acids or polymethacrylic acids, polyurethanes, poly-N-vinylpyrrolidones and their copolymers, cellulose ethers, including carboxymethyl cellulose, or mixtures containing at least two such thickening agents. Additional examples of thickening agents (5) which may be employed are polyvinyl alcohols, alginates, and starch.

The thickening agent (5) is preferably used in an amount of from 1 to 10 parts by weight for each 60 to 90 parts by weight of the diorganopolysiloxane (1).

The vinyl-containing trimethylsiloxy end-blocked diorganopolysiloxane (6) in which from 10 to 50 percent of the organic radicals bonded to the Si atoms of the diorganosiloxane units are vinyl groups and the remaining organic radicals in this organopolysiloxane are free from aliphatic multiple bonds, can be represented by the following general formula:

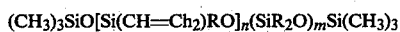

$(CH_3)_3SiO[Si(CH=CH_2)RO]_n(SiR_2O)_mSi(CH_3)_3$ in which R is the same as above and n and m are integers in which the ratio of m:n is between 10:1 and 1:1.

Also, additional siloxane units other than those having the formulas $SiR_2O$ and $Si(CH=CH_2)RO$, may be present within or along the organopolysiloxane chain. Examples of such other units which are generally present only as impurities are especially those having the formulas $RSiO_{3/2}$, $R_3SiO_{\frac{1}{2}}$, and $SiO_{4/2}$, where R is the same as above. Preferably, the amount of such other siloxane units does not exceed about one mole percent in the molecules of the diorganopolysiloxane (6).

The examples for the hydrocarbon radicals represented by R in the diorganopolysiloxane (1) are equally applicable for the hydrocarbon radicals in diorganopolysiloxane (6) which are free of aliphatic multiple bonds. Nevertheless, it is preferred that at least 90 percent of the number of R radicals in diorganopolysiloxane (6) be methyl radicals.

The diorganopolysiloxane (6) may consist of the same copolymers or of mixtures of different copolymers, all of which have the same degree of polymerization, or they may consist of mixtures of the same or different copolymers having different degrees of polymerization. The different diorganopolysiloxane units may be present in a random distribution, or they may be present in the form of block copolymers.

It is preferred that the diorganopolysiloxane (6) have an average viscosity of from 500 to 5000 mPa.s at 25° C.

It is preferred that the trimethylsiloxy end-blocked diorganopolysiloxane (6), in which from 10 to 50 percent of the organic radicals bonded to the diorganosiloxane units, be vinyl groups and the remaining organic radicals in the organopolysiloxane are free of aliphatic multiple bonds, be employed in an amount of from 3 to 30 parts by weight for each 60 to 90 parts by weight of the diorganopolysiloxane (1).

Examples of the organosilicon compounds (7) having adhesive properties are silanes having hydrolyzable radicals, and vinyl, acryloxy, methacryloxy, epoxy, or amino groups which are bonded to silicon via carbon, partial hydrolysates of such silanes, and for example reaction products of vinyltriacetoxysilane and the silane having the following formula:

$$\overset{O}{\underset{CH_2-CHCH_2O(CH_2)_3Si(OCH_3)_3}{\diagup\!\diagdown}}.$$

Only one type of adhesive or a mixture consisting of at least two different types of adhesives may be used in the process of this invention.

It is preferred that the adhesive (7) be used in an amount of from 1 to 15 parts by weight for each 60 to 90 parts by weight of the diorganopolysiloxane (1). Also, the sum of all the constituents (1) through (4) and (6) and (7) used within the aforementioned preferred parameters is preferably 100.

The ethylene, vinyl acetate, or acrylic acid ester polymers or copolymers containing at least two of these monomers or copolymers in the aqueous dispersion (8) are preferably capable of being crosslinked.

It is preferred that the aqueous dispersion (8) be employed in an amount of from 50 to 2000 parts by weight for each 60 to 90 parts by weight of diorganopolysiloxane (1).

It is preferred that the total amount of water in which constituents (1) through (8) are dissolved or dispersed amount to about 50 to 200 percent by weight, based on the total weight of the constituents (1) through (8).

It is preferred that organopolysiloxane emulsions having Si-bonded vinyl groups be stored separatedly from the organopolysiloxane emulsions having Si-bonded hydrogen, in order to prevent premature crosslinking. Furthermore, the catalyst (3) which promotes the addition of Si-bonded hydrogen to an aliphatic multiple bond should not be mixed with diorganopolysiloxanes (1) or (6), or with any mixture of such diorganopolysiloxanes, before the catalyst comes into contact with water or with the organopolysiloxane (2).

In the preparation of the aqueous dispersions containing constituents (1) through (3), and optionally constitutents (4) and (5), it is possible to use any dispersing agent which has been or could have been used heretofore in preparing organopolysiloxane emulsions, including the polymerization of organosiloxanes in an aqueous emulsions. It is preferred that the dispersing agents used in the process of this invention be nonionic emulsifiers.

In addition to the constituents mentioned above, other constituents may be incorporated in the coating composition of this invention. Examples of such additional constituents are fillers and pigments.

The aqueous emulsions of this invention may be applied to the substrates by any method which is suitable for coating substrates with liquid substances, such as by immersion, coating, pouring, spraying, calendering, printing, coating with a blade, as well as a Meyer rod, or with the aid of an airbrush.

An aqueous dispersion containing components (1) through (8) may be applied once or several times to the substrates. It is, however, also possible to first apply once or several times an aqueous dispersion containing, for example, only constituents (5), (7) and (8), and thereafter apply once or several times an aqueous dispersion containing the other constituents. The latter process results in coatings which are especially resistant to washing and cleaning.

The organopolysiloxanes (1) and (6) and the polymers or copolymers of dispersion (8), provided they are cross-linkable, are cross-linked by heating, preferably at temperatures of at least 120° C. In order to obtain a coating which is free of bubbles, it is preferred that the coated material first be dried at temperatures between 85° and 95° C. When several coats are to be applied, it is sufficient that the material be dried after each coating, and that cross-linking take place following the application of the final coat.

The coating may also be exposed to ultra-violet light or it can be heated and exposed to ultra-violet light to effect cross-linking.

In the case of a polyamide taffeta having a weight of 60 g/m², from 12 to 15 g/m² of a dried coating is sufficient.

In the following examples, all parts and percentages are by weight, unless otherwise specified.

A mixture containing a platinum complex and a diluent was prepared in the following manner and used in the examples:

About 20 parts of sodium bicarbonate were added to a mixture consisting of 10 parts of $H_2PtCl_6 \cdot 6H_2O$, 20 parts of 1,3-divinyl-1,1,3,3-tetramethyldisiloxane and 50 parts of ethanol. The mixture was agitated and heated for 30 minutes under reflux and then allowed to stand for 15 hours. It was then filtered and the volatile components were removed from the filtrate by distillation at about 16 mbar. The residue was dissolved in benzene and the solution filtered and the benzene distilled from the filtrate. The residue was then dissolved in a dimethylpolysiloxane containing terminal vinyldimethylsiloxy groups, and having a viscosity of 1000 mPa.s at 25° C., in such an amount that the solution contained 1 percent by weight of platinum, calculated as elemental platinum.

EXAMPLE 1

About 224 g of an aqueous emulsion containing:

(a) 37.7 parts of a dimethylpolysiloxane containing terminal vinyldimethylsiloxy units and having a viscosity of 1000 mPa.s at 25° C., (b) 37.5 parts of a dimethylpolysiloxane containing terminal vinyldimethylsiloxy units and having a viscosity of 20,000 mPa.s at 25° C., (c) 4.0 parts of a trimethylsiloxy end-blocked dimethylpolysiloxane which consists of 85.7 mole percent of dimethylsiloxane units, and 14.3 mole percent of vinylmethylsiloxane units, and having a viscosity of 1000 mPa.s at 25° C., (d) 8.3 parts of a trimethylsiloxy end-blocked organopolysiloxane, which consists of 50 mole percent of methylhydrogensiloxane units, and 50 mole percent of dimethylsiloxane units, and having a viscosity of 120 mPa.s at 25° C., (e) 0.4 part of the platinum complex and diluent prepared above, (f) 12.0 parts of an organosilicon adhesive compound, which was obtained by heating a mixture containing 10 g of vinyltriacetoxysilane and 13 g of a silane having the following formula:

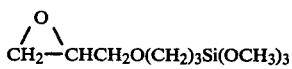

for one hour at 200° C., and (g) 0.1 part of ethinylcyclohexanol, in which 37.5 parts of the mixture corresponds to a 19.3 percent concentration in the emulsion, were mixed with (h) 730 g of an aqueous dispersion of a copolymer of ethylene and vinyl acetate, containing methylol groups and having a solids content of 45 percent ("Vinnapas ®EN 300" manufactured by Wacker-Chemie GmbH) and (i) 46 g of a water-soluble thickening agent, which is based on polyurethane, and has a solids content of 25 percent ("Collacral ®LR 8500" BASF).

The resultant mixture is applied with the aid of a doctor blade to a tightly woven polyamide taffeta (filament fabric) with a weight of 60 g/m² and then dried for 30 seconds at 90° C. The coating is then cross-linked by heating for 2 minutes to 150° C. The fabric has a coating of 12 g/m².

The water-proofing factor of the coated fabric is 1000 mm, as determined in accordance with DIN (German Industrial Standard) No. 53,886. This value is preserved even after laundering in an automatic washer at 30° C. Ever after the coated fabric was exposed to a saturated aqueous steam atmosphere at 90° C. for eight days, there is no evidence of any decrease in the coating's resistance to abrasion.

EXAMPLE 2

An aqueous dispersion was prepared by mixing (a) 96.0 parts of an aqueous dispersion of a copolymer of ethylene and vinyl acetate containing methylol groups and having a solids content of 45 percent ("Vinnapas ®EN 300") with (b) 1.5 parts of an organosilicon adhesive compound, which was obtained by heating 10 g of vinyltriacetoxysilane and 13 g of a silane having the formula

for one hour at 200° C., and (c) 2.5 parts of a water-soluble copolymer of N-vinylpyrrolidone having a solids content of 30 percent as a thickening agent ("Collacral ®VL" BASF).

The aqueous emulsion was then applied twice with a doctor blade to a tightly woven polyamide taffeta (filament fabric) weighing 60 g/m². The fabric was dried at 95° C. for 45 seconds after each coating.

An aqueous emulsion was then applied to the precoated fabric containing (d) 42.7 parts of a vinyldimethylsiloxy terminated dimethylpolysiloxane having a viscosity of 1000 mPa.s at 25° C., (e) 42.4 parts of a vinyldimethylsiloxy terminated dimethylpolysiloxane having a viscosity of 20,000 mPa.s at 25° C., (f) 4.5 parts of a trimethylsiloxy end-blocked diorganopolysiloxane which consists of 85.7 mole percent of dimethylsiloxane units, and 14.3 mole percent of vinylmethylsiloxane units, and has a viscosity of 1000 mPa.s at 25° C., (g) 9.7 parts of a trimethylsiloxy end-blocked organopolysiloxane which consists of 50 mole percent methylhydrogensiloxane units, and 50 mole percent dimethylsiloxane units, and has a viscosity of 120 mPa.s at 25° C., (h) 0.5 part of the platinum complex and diluent prepared above, (i) 0.2 part of ethinylcyclohexanol, in which 42.7 parts of the mixture corresponds to a 20.5 percent concentration in the emulsion, and each 9 parts of the emulsion is thickened by adding a small amount of aqueous ammonia, and one part of a 6 percent dispersion of polyacrylic acid or polymethacrylic acid ("Rohagit ®SD 15" Roehm GmbH).

The coated fabric is dried for 45 seconds at 95° C. and then the coating is cross-linked by heating to 150° C. for 2 minutes. The fabric contains 23 g/m² of coating.

The water-proofing factor of the coated fabric is 1000 mm, as determined in accordance with DIN 53,886. After 5 washings at 30° C. in an automatic household washer, the water-proofing value is still 900 mm. Even after the coated fabric has been exposed to a saturated aqueous steam atmosphere at 90° C., no detrimental effect on the coating's resistance to abrasion could be detected.

EXAMPLE 3

About 205 g of an aqueous emulsion containing:

(a) 40.5 parts of a dimethylpolysiloxane having terminal vinyldimethylsiloxy units and a viscosity of 1000 mPa.s at 25° C., (b) 40.3 parts of a dimethylpolysiloxane having terminal vinyldimethylsiloxy groups and a viscosity of 20,000 mPa.s at 25° C., (c) 4.3 parts of a trimethylsiloxy end-blocked diorganopolysiloxane which consists of 85.7 mole percent of dimethylsiloxane units, and 14.3 mole percent of vinylmethylsiloxane units, and has a viscosity of 1000 mPa.s at 25° C., (d) 9.3 parts of a trimethylsiloxy end-blocked organopolysiloxane which consists of 50 mole percent of methylhydrogensiloxane units, and 50 mole percent of dimethylsiloxane units, and has a viscosity of 120 mPa.s at 25° C., (e) 0.4 part of the platinum complex and diluent prepared above, (f) 5.0 parts of an organosilicon adhesive compound which is obtained by reacting 10 g of vinyltriacetoxysilane with 13 g of a silane having the following formula

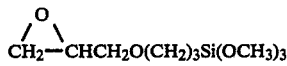

at 200° C. for one hour, and (g) 0.2 part of ethinylcyclohexanol, in which 40 parts of the mixture corresponds to a 20 percent concentration of the emulsion, are mixed with:

(h) 745 g of an aqueous dispersion of a copolymer of ethylene and vinyl acetate, containing methylol groups and having a solids content of 45 percent ("Vinnapas ®EN 300") and (i) 50 g of a water-soluble copolymer of N-vinyl-pyrrolidone having a solids content of 30 percent as a thickening agent ("Collacral ®VL" BASF).

About 10 parts of the resultant mixture are mixed with 1 part of a mixture consisting of equal parts of blue pigment ("Colanylblau AR") and a TiO₂ suspension in water (TiO₂ content: 65 percent).

The colored dispersion thus obtained is applied with a doctor blade to a white polyester fabric weighing 154 g/m², whose warp thread is a filament yarn and whose weft thread consists of a stable fiber, and then dried at 90° C. for 30 seconds. The coating is heated at 150° C. for 2 minutes to effect cross-linking.

The colored dispersion is first applied at such a rate that after cross-linking, the coating amounts to 30 g/m². The water-proofing value of the coated fabric is 300 mm, as determined in accordance with DIN 53,886. The dispersion is then applied at a rate which, following cross-linking, amounts to 45 g/m². The water-proofing factor of the coated fabric is 1000 mm, as determined in accordance with DIN 53,886.

These coated fabrics may be used for manufacturing tents and awnings.

COMPARISON EXAMPLE

An aqueous emulsion containing:

(a) 37.7 parts of a dimethylpolysiloxane having terminal vinyldimethylsiloxy units and a viscosity of 1000 mPa.s at 25° C., (b) 37.5 parts of a dimethylpolysiloxane having terminal vinyldimethylsiloxy units and a viscosity of 20,000 mPa.s at 25° C., (c) 8.3 parts of a trimethylsiloxy end-blocked organopolysiloxane which consists of 50 mole percent of methylhydrogensiloxane units and 50 mole percent of dimethylsiloxane units, and a viscosity of 120 mPa.s at 25° C., (d) 0.4 part of a mixture consisting of the platinum complex and diluent prepared above, and 0.1 part ethinylcyclohexanol, in which 37.5 parts of the mixture corresponds to a 19.3 percent concentration in the emulsion, and each 9 parts of the emulsion is thickened by adding a small amount of aqueous ammonia, and 1 part of a 6 percent dispersion of polyacrylic acid or polymethacrylic acid ("Rohagit ®SD 15" Roehm GmbH).

The aqueous emulsion is applied with a doctor blade to a tightly woven polyamide taffeta (filament fabric) weighing 60 g/m², dried at 90° C. for 30 seconds, and then cross-linked by heating to 150° C. for 2 minutes. The fabric has a coating of 14 g/m².

In the above Example, the process of Example 1 is repeated, except that the comparison example does not contain the trimethylsiloxy end-blocked dimethylpolysiloxane having dimethylsiloxane and vinylmethylsiloxane units, the organosilicon compound which may be used as an adhesive, and the aqueous dispersion containing a copolymer of ethylene and vinyl acetate. A different thickening agent is employed because the thickening agent employed in Example 1 is not suitable as a thickening agent in an aqueous organopolysiloxane emulsion, which does not contain the additional polymers.

The water-proofing factor of the coated fabric is 1000 mm, as determined in accordance with DIN 53,886. However, after just one washing at 30° C. in an automatic household washer, the water-proofing factor decreases to less than 100 mm. Furthermore, the coating can be easily removed by rubbing.

What is claimed is:

1. A process for coating a substrate which comprises (A) coating the substrate with an aqueous emulsion containing:
   (1) A diorganopolysiloxane having terminal SiC-bonded vinyl groups and an average viscosity of from 1000 to 100,000 mPa.s at 25° C.,
   (2) An organopolysiloxane having at least three Si-bonded hydrogen atoms per molecule,
   (3) A catalyst which promotes the addition of Si-bonded hydrogen to an aliphatic multiple bond,
   (6) A vinyl-containing trimethylsiloxy end-blocked diorganopolysiloxane which is present in an amount of from 3 to 30 parts by weight for each 60 to 90 parts by weight of diorganopolysiloxane (1), in which from 10 to 50 percent of the number of the organic radicals bonded to the Si atoms of the diorganopolysiloxane units are vinyl groups and the remaining organic radicals are free of aliphatic multiple bonds,
   (7) An organosilicon adhesive compound, and
   (8) At least one aqueous dispersion of a polymer selected from the group consisting of ethylene, vinyl acetate, acrylic acid esters, and copolymers thereof containing at least two of these monomers and thereafter (B) crosslinking the coated substrate.

2. The process of claim 1, wherein the aqueous emulsion contains an agent (4) which retards the addition of Si-bonded hydrogen to an aliphatic multiple bond.

3. The process of claim 1, wherein a thickening agent (5) is mixed with the aqueous emulsion.

4. The process of claim 1, 2 or 3 wherein the aqueous dispersion (8) is present in an amount of from 50 to 2000 parts by weight for each 60 to 90 parts by weight of the diorganopolysiloxane (1).

5. The process of claim 1, wherein the aqueous dispersion (8) contains cross-linkable polymers.

6. The process of claim 1, wherein the coated substrate is heated to an elevated temperature to cross-link the organopolysiloxanes.

7. The process of claim 1, 2 or 3, wherein the vinyl-containing trimethylsiloxy end-blocked diorganopolysiloxane (6) is added to an aqueous emulsion containing constituents (1) through (5) and (7) and (8).

8. The process of claim 1, wherein the coated substrate is crosslinked with ultraviolet light.

9. The process of claim 1, wherein the coated substrate is dried at an elevated temperature prior to crosslinking.

10. A process for coating a substrate which comprises (A) applying to the substrate at least one coat of (a) an aqueous emulsion containing:
   (5) A thickening agent,
   (7) An organosilicon adhesive compound, and
   (8) At least one aqueous dispersion of a polymer selected from the group consisting of ethylene, vinyl acetate, acrylic acid esters and copolymers thereof containing at least two of these monomers, (B) drying the coated substrate, then (C) applying to the coated substrate (b) an aqueous emulsion containing:
   (1) A diorganopolysiloxane having terminal SiC-bonded vinyl groups and an average viscosity of from 1000 to 100,000 mPa.s at 25° C.,
   (2) An organopolysiloxane having at least three Si-bonded hydrogen atoms per molecule,
   (3) A catalyst which promotes the addition of Si-bonded hydrogen to an aliphatic multiple bond, and
   (6) A vinyl-containing trimethylsiloxy end-blocked diorganopolysiloxane which is present in an amount of from 3 to 30 parts by weight for each 60 to 90 parts by weight of diorganopolysiloxane (1), in which from 10 to 50 percent of the number of the organic radicals bonded to the Si atoms of the diorganopolysiloxane units are vinyl groups and the remaining organic radicals are free of aliphatic multiple bonds and thereafter (D) crosslinking the coated substrate.

11. The process of claim 10, wherein the aqueous dispersion (8) is present in an amount of from 50 to 2000 parts by weight for each 60 to 90 parts by weight of diorganopolysiloxane (1).

12. The process of claim 10, wherein the aqueous dispersion (8) contains cross-linkable polymers.

13. The process of claim 10, wherein the aqueous emulsion (b) contains an agent (4) which retards the addition of Si-bonded hydrogen to an aliphatic multiple bond.

14. The process of claim 10, wherein more than one coat of aqueous emulsion (a) is applied to the substrate prior to the application of aqueous emulsion (b).

15. The process of claim 14, wherein more than one coat of aqueous emulsion (b) is applied to the coated substrate.

* * * * *